Figure 1:
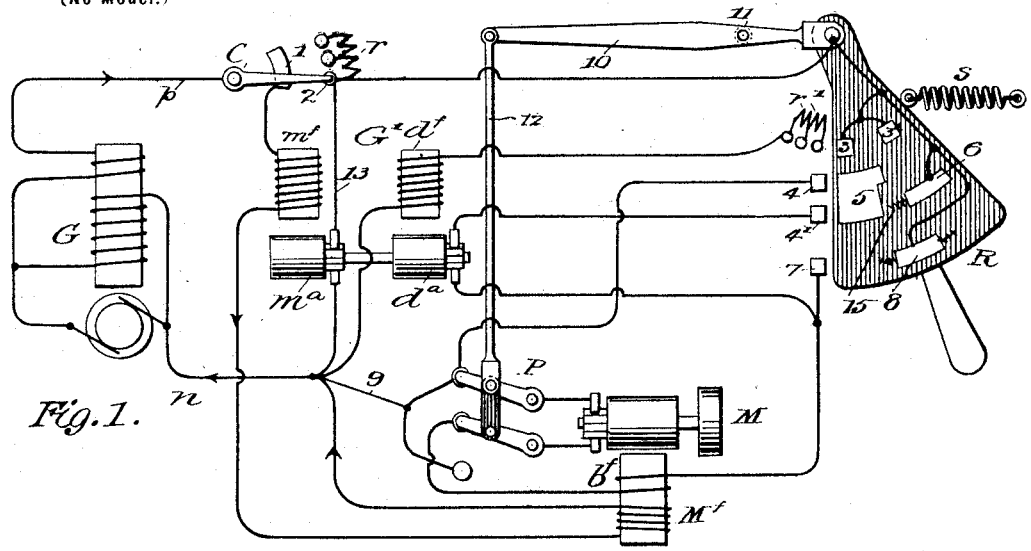

No. 630,280. Patented Aug. 1, 1899.
G. T. WOODS.
SYSTEM OF ELECTRICAL DISTRIBUTION.
(Application filed Oct. 30, 1896.)

(No Model.)

WITNESSES:
Wm H. Capel.
D. H. Decker.

INVENTOR
Granville T. Woods
BY
ATTORNEY

UNITED STATES PATENT OFFICE.

GRANVILLE T. WOODS, OF NEW YORK, N. Y., ASSIGNOR TO EDWARD L. KERR, OF JERSEY CITY, NEW JERSEY.

SYSTEM OF ELECTRICAL DISTRIBUTION.

SPECIFICATION forming part of Letters Patent No. 630,280, dated August 1, 1899.

Application filed October 30, 1896. Serial No. 610,549. (No model.)

*To all whom it may concern:*

Be it known that I, GRANVILLE T. WOODS, a citizen of the United States, and a resident of New York, in the county of New York and State of New York, have invented a certain new and useful System of Electrical Distribution, of which the following is a specification.

My invention relates to a system of distribution whereby electric current can be economically furnished to electrical translating devices, especially such as motors, and the motors conveniently and effectively operated and regulated when used in connection with railways, elevators, hoists, cranes, &c.

In carrying out my invention I employ two sources of energy preferably of unequal electromotive force, one generative source being of constant potential and the other generative source being variable and capable of furnishing a maximum electromotive force greater than that of the constant-potential source. I also employ a working motor preferably wound for an electromotive force approximately equal to the sum of the maximum electromotive forces produced by the two sources in series.

One method of operation and regulation consists in starting the working motor of such a system with power derived from the variable-potential source, the electromotive force of which may be gradually increased until it exceeds that of the constant-potential source, then supplying the working motor from both electromotive forces in parallel and cutting a terminal of the variable-potential source into the constant-potential circuit, then opening the circuit from the variable potential source, withdrawing the first electromotive force, and then throwing the two electromotive forces into series and building up the electromotive force from the variable-potential source until the desired total electromotive force is produced. That is to say, the motor is coupled up to one of said generators, and then to both in series to vary the power and speed of the motor.

My invention further consists in certain other modes of associating and bringing into coöperation the several elements of this system by means of a triad or three-part switch mechanism, each part consisting of a distinct set of electrical contacts and connections, one of which parts controls the reversing terminals of the working motor, another part controls the field of the variable-potential generator, and the third part the circuit connections of the armatures of the three machines. The two latter parts are so arranged that they move simultaneously when the system is being regulated. Therefore when referring hereinafter to these two parts together it will be by the term "regulator" and when referring to the reversing part it will be called the "reverser." The three parts of the switch mechanism are mechanically connected together, so that the entire mechanism may be always under the control of a single lever, as hereinafter set forth.

My invention also consists in certain constructions, combinations, and arrangements of parts hereinafter specifically described and claimed.

Figure 2:
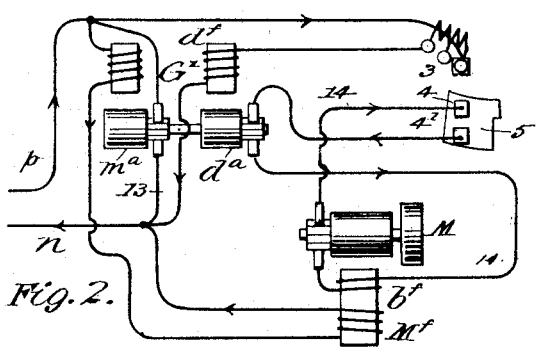
Figure 3:
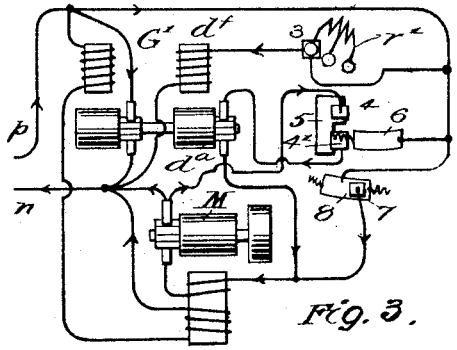
Figure 4:
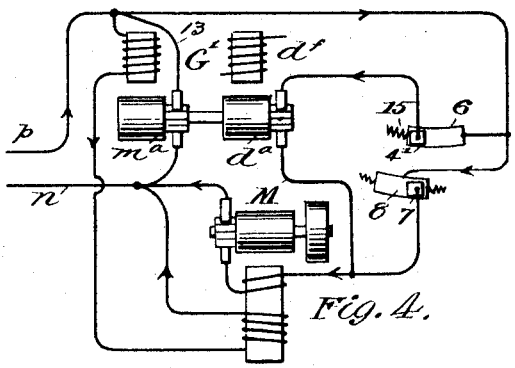
Figure 5:
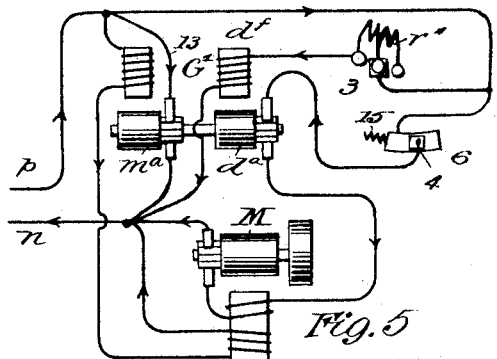

In the accompanying sheet of drawings, which forms a part of this specification, Figure 1 is a diagrammatic representation of the system in which the regulator is shown open. Fig. 2 is a diagram showing the circuits which are established when the regulator is in the first position, all the wires in which no current is flowing being omitted. Fig. 3 is a similar diagram showing the circuits which are established in a succeeding position of the regulator. Fig. 4 shows circuits succeeding Fig. 3. Fig. 5 is a similar diagram showing the circuits which are established in the final position of the regulator.

The arrangement is such that the circuit between the working motor and one or both generators will be preserved in all positions of the regulator after it has closed the first circuits and the first circuits maintained closed until the variable-potential generator's second terminal is cut into the constant-potential circuit.

The parts are as follows: The generator G, shown as a compound machine, is the constant-potential generator and gives a constant-potential current. The variable-potential generator G' is shown as a dynamotor. The motor-armature of the dynamotor operates in a practically constant magnetic field and is connected across the constant-potential circuit in shunt with its field. Therefore its field is practically constant. Any suitable power may be employed to drive generator G'. It is connected with the line and return $p$ and $n$, in which the current will be assumed to flow in the direction indicated by the arrowheads. Its motor-field $m^f$ and the motor-armature $m^a$ and its dynamo-field $d^f$ are when in circuit connected with the main generator in parallel and its dynamo-armature $d^a$ connected at times in a local circuit and at times to the line. The working motor M is shown as a compound machine having shunt field-coils $M^f$, connected in series with the field-coils $m^f$, and series field-coils $b^f$ in series with the dynamo-armature $d^a$.

The circuit-closer and the regulator are open when the system is not in use. The circuit-closer is closed first in putting the system into use. The reverser P is always closed on one side or the other.

There are two contacts at the switch C, of which that marked 1 is connected with the field-coil $m^f$ and serves to connect the line and return through this field-coil. The other contact 2 is provided with a rheostat $r$ and is connected to the return through the armature $m^a$ of the dynamotor.

The regulator is provided with a spring $s$, which tends to hold it open. This regulator has two sets of contacts, and before proceeding to the consideration of the general operation of the switch mechanism these sets of contacts and their functions will be separately stated.

First. There is a pair of plates 3 3' on the regulator which are connected with each other and to line and which connect successively with the contact-points of a rheostat $r'$, thereby gradually increasing or decreasing the resistance of the line. The contacts 3 and 3' are preferably set on the regulator so far apart that the first passes off of the row of rheostat-plates at one end before the second passes on at the other end. In throwing the regulator from one extreme position to the other the rheostat $r'$ and the field $d^f$ of the variable-potential generator are cut into the circuit and the resistance is gradually diminished. Then the field and the rheostat are cut out. Then they are again cut into the circuit, and the resistance is again gradually diminished.

Second. There are two fixed contact-points 4 4', an insulated plate 5, which makes contact with both to connect them, and the plate 6, connected to line which makes connection with point 4' only. The plates 5 and 6 are separated by a space somewhat broader than the width of the contacts 4 4'. When the regulator is thrown from one extreme position to the other, the two contacts 4 4' will be connected through plate 5. Then one of them, 4', will be connected to line through plate 6. Then 4 will be cut out. The maximum potential of the variable-potential generator is sufficiently higher than that of the constant-potential generator to compensate for the drop of the potential caused by the resistance in the circuit when contacts 4 4' are on plate 5.

There is one contact-point 7 and one plate 8 on the regulator which makes contact with point 7 and is connected to line.

The sets of contacts are relatively so located that in moving the regulator to increase the electromotive force contact will be made at plate 8 just before the break at plates 3 and 5. On further movement of the regulator in the same direction contact is made by point 4' with the resistance-terminal of plate 6. This resistance is sufficiently great to practically prevent current from the line shunting through point 4 past the motor. Then plate 3' engages with the rheostat $r'$ before contact is broken between plate 8 and point 7. When the regulator is moved back, the order of these connections and breaks is of course reversed. It will be noted also that the contact 8 is terminated at each end in a graduated resistance to prevent sparking as contact 7 moves off from it.

The reverser P, as shown in Fig. 1, consists of three contact-points and two switch-fingers insulated from each other, but mechanically connected. Two of the contact-points are connected with the return-wire, and a third is connected with the field-coils $b^f$. The two switch-fingers are connected directly each to one of the armature-brushes of the working motor. It is obvious that the direction of the current through the local circuit traversing the armature of the working motor is changed on throwing the fingers of said reverser P from one position to the other.

The reverser P is preferably operated in conjunction with regulator R. To this end the fingers of the former and the plate carrying the movable contacts of the latter are pivoted to the ends of a lever 10, fulcrumed at 11, the fingers of reverser P being connected by link 12 to said lever. The pivot 11 is so located in lever 10 and the fixed and movable contacts are so proportioned that a vertical movement of the regulator R to throw the reverser P will still leave said regulator in an operative position.

The local circuit above referred to includes the armature $d^a$ of the variable-potential generator, points 4 4' and plate 5 of the regulator R, the reverser P, the armature of the working motor, and the field-coils $l^f$ of the working motor. A point in this local circuit is connected permanently to the constant-potential line at the reverser P, as by conductor 9, and another point in said circuit is connected to the constant-potential line temporarily in the operation of the system, as at the plate 7. The local circuit is closed only when the contact-points 4 4' and the plate 5 are in engagement.

The operation may be stated as follows: The circuit-closer and regulator being opened, the former is first closed. The circuit is then through the field-coil $m^f$ of the motor, part of the dynamotor, of which the variable-potential generator is a part, and the field-coil $M^f$ of the working motor, while current is supplied to the motor-armature $m^a$ of the dynamotor over the shunt-circuit 13. The dynamotor then starts up. The regulator is then closed at plates 3 and 5. This will establish the circuits, as shown in Fig. 2. As the rheostat $r'$ is gradually cut out, the field $d^f$ of the variable-potential generator is gradually strengthened and the output of its armature $d^a$ is gradually brought up to the full capacity, at which it slightly exceeds the electromotive force of the line. The current generated flows through the local circuit above referred to and here indicated at 14. In the meantime the working motor has gradually started up. Then by further movement of the regulator contact is established between point 7 and plate 8 and between the resistance-terminal of plate 6 and contact 4', the resistance-terminal being provided to prevent an arc forming when the local circuit is broken from the constant-potential circuit. The terminating projection of plate 5 overlaps the extreme end of the resistance-terminal of plate 6, so that the terminal of the variable potential generator may be cut into the constant-potential circuit before the local or variable-potential circuit is broken. The line now supplies current to the working motor and its field-coils $b^f$ along with the armature $d^a$. This is an operative position shown in Fig. 3. As the regulator is moved farther on very little current shunts through said high-resistance terminal 15 of plate 6, the local circuit is broken at plate 5, and contact is immediately thereafter broken at plate 3. This will establish the circuit shown in Fig. 4. In this position of the parts the line alone supplies the working motor, but the current passes in part through the armature $d^a$ of the variable-potential generator, which, however, is itself generating no current with this position of the regulator, since its field $d^f$ is dead. On further movement of the regulator contact is closed at plate 3' and broken at plate 8. This establishes the circuits, as shown in Fig. 5. In this position of the parts the current from the line to the armature of the working motor all passes through the armature $d^a$ of the variable-potential generator. As the rheostat $r'$ is gradually cut out the field $d^f$ is increased and the armature $d^a$ of the variable-potential generator begins to add electromotive force to that supplied from the line.

To stop the working motor and the dynamotor, the regulator is first moved back to the starting-point to brake the motor, as hereinafter described, and then opened, and then the circuit-closer is opened.

It will be observed from the foregoing that in bringing the motor to rest the circuits must be disorganized inversely as they were organized when bringing the motor up to full speed—that is to say, in moving the regulator outward (toward the right) the field of the variable-potential generator is gradually cut out and contacts 7 and 8 are connected, as shown in Fig. 4. The variable-potential generator is thus inert and energy is supplied direct from the constant-potential generator to the motor through said contacts 7 and 8 and their circuit connections. Then a further movement of the regulator again cuts the variable-potential-generator field into circuit, as shown in Fig. 3, and a further movement of the regulator separates contacts 7 and 8 and plate 5 and contact 6, as shown in Fig. 2. During the outward movement of said regulator the motor was being continually deprived of its operative energy. A further movement of the regulator may be made to cut out the field of the variable-potential generator.

To reverse the working motor, the regulator is first shifted back to the starting-point, as shown in Fig. 2, to withdraw both electromotive forces from the motor-armature. Then the energy generated in the motor-armature will circulate in a temporary local circuit of low resistance, thereby quickly bringing the motor-armature to rest. Then the circuit through the variable-potential-generator armature may be opened. The reverser P is then reversed by vertically moving the regulator, and then the latter is gradually closed to operate the motor. When both generators are employed in series operating a hoist, crane, or an elevator-car, the working motor may be reversed by reducing the electromotive force generated between the constant-potential source and the motor to a point below that required by the motor to lift the load. Then the load will reverse the motor. Practically simultaneously with said reversal of the motor-armature the position of reverser P should be changed to reverse the motor-terminals. This movement can be accomplished with ease, despatch, and certainty because of the three parts of the switch mechanism being mechanically coupled together.

It is obvious that the different movements of the regulator will vary the torque of the motor as desired and control the speed from rest to full speed and that this system may be employed to propel railway-cars, the working motor being suitably geared to the car-axle to drive the car or otherwise suitably arranged, while the dynamotor is carried by the car and furnishes electrical energy only. Any suitable winding may be used on the working motor.

It will be noted that in starting the working motor from a state of rest a small current at full voltage is taken from the constant-potential circuit to operate the motor-generator or converter, which in turn transforms or converts the energy so received into a large induced current of small voltage and delivers the same to the armature of the working motor. The field of the working motor being largely charged will cause the motor to start with a powerful torque. This torque may be made to remain constant independent of the speed of the working motor, or the speed may be made to remain constant independent of the torque, or the speed and torque may be varied independently of each other by manipulating the regulator.

Since, as pointed out hereinbefore, the variable-potential generator furnishes one-half of the energy supplied to the working-motor armature while the motor is working at full speed, the remaining portion of the energy being supplied by the constant-potential generator as an assistant to the variable-potential generator, and since the energy developed by the variable-potential generator depends upon the strength of its field and the speed of its armature, the variable-potential generator may be one-half the size of the working motor. It is also to be noted that during the various manipulations of the regulator there are times when the working motor becomes a generator in local circuit with the variable-potential armature. Said armature then becomes a motor to drive the armature which is mechanically connected thereto and the latter armature in turn becomes a generator and feeds energy back into the line.

I have discovered by experiment that it is necessary that some means be provided to prevent or destroy the arcs which are liable to form when the controlling-switch is shifted. Otherwise as the changes in circuit connections are made the arcs will spring across the space between the plates or connecting contact-points, and thus short-circuit and damage the system. To provide against this evil, graduated resistances 15 are placed at the ends of the plates of the switch, as shown at plates 6 and 8.

It is obvious that many modifications can be made in this system without departing from the spirit of the invention. For instance, the generators and working motor may be either shunt or compound wound. Therefore, without limiting myself to the details shown,

What I claim, and desire to secure by Letters Patent of the United States, is—

1. In a system of electrical distribution supplied with current from two sources of energy one of which is of variable potential, the method of starting and regulating an electric motor, consisting in supplying current thereto from the variable-potential source, gradually increasing the electromotive force from this source until the maximum potential is reached, supplying the motor with current from both sources in parallel, opening the variable-potential circuit, then withdrawing the first electromotive force, and then throwing the two electromotive forces into series and varying the electromotive force from the variable-potential source.

2. In a system for controlling electrodynamic machinery, the combination with a motor, of a constant-potential generator whose speed is maintained practically constant, a variable-potential-generator armature, electrical connections between the motor-armature and the variable-potential-generator armature, and means for varying the potential of the variable-potential generator, and for electrically connecting and disconnecting the motor-armature to and from the constant-potential-generator circuit while the operation of the variable-potential generator is maintained and for reversing the motor, substantially as set forth.

3. In a system for controlling electrical machinery, the combination with a motor, of a variable non-reversible potential generator and a constant-potential generator, means for making electrical connections between the armature of the motor and the armature of the variable-potential generator, and for electrically connecting the motor-armature to the constant-potential generator and for varying the potential of the variable-potential generator, and for coupling the variable-potential generator in series with the constant-potential generator, and for reversing the motor, substantially as set forth.

4. The method of operating and controlling an electric motor supplied with current from a constant-potential generator and a variable-potential generator, which consists in starting the motor with energy from one of said generators, gradually increasing the electromotive force of the energy delivered to the motor, until a certain potential is reached, withdrawing from the circuit the energy developed in the variable-potential generator, adding together in series the electromotive forces developed in both generators, then gradually increasing the electromotive force developed in the variable-potential generator, substantially as set forth.

5. The combination with a variable-potential generator, a constant-potential generator and a motor which receives energy therefrom, of means so arranged that in being shifted the variable-potential generator is coupled to the motor, then the potential thereof is raised, then the constant-potential generator is coupled to the motor, then the electromotive force of the variable-potential generator is reduced, then the variable-potential generator is coupled in series with said constant-potential generator and said motor, and then the electromotive force of the variable-potential generator is again raised, substantially as set forth.

6. The combination with a constant-potential generator, of a motor driven thereby, a variable-potential generator mechanically connected with and driven by said motor, and a working motor supplied with energy from the variable-potential generator and then from both generators in series, the electromotive force of the variable-potential generator being varied, while the energy of the other generator is delivered to the working motor only at a constant potential, the circuit connections being controlled by a three-part switch mechanism of which one of the parts is in control of the motor-reversing terminals and is mechanically coupled to the other two parts while they couple up the circuits, substantially as and for the purpose set forth.

7. The combination with a constant-potential source, of a practically constant-speed motor driven thereby, a variable-potential generator mechanically connected with and driven by said motor, and a working motor, the said variable-potential generator and said constant-speed motor rotating independently of the motion of said working motor, the field-windings of the constant-speed motor and the working motor being connected in series with each other across the constant-potential source, the field-winding of the variable-potential generator being attachable across the constant-potential source in multiple with the other two windings, and means for coupling up said variable-generator field-winding across the constant-potential source and for coupling said working motor to the variable-potential generator and then to the said constant-potential source and the variable-potential source in series to control the motor, substantially as set forth.

8. In an electrical system having a constant-potential generator, a variable-potential generator, and means for connecting and disconnecting said generators to and from each other, the method of controlling the supply of energy delivered to a working motor which consists in coupling the motor to the variable-potential generator, then raising the potential of said generator until its maximum is reached, (the motor is then supplied with one-half the energy required for its full operation,) then shifting the connections until both generators are coupled in series with the motor and the field-circuit of the variable-potential generator is opened, and then again raising the potential of the variable generator, for the purpose set forth.

9. The method of operating and controlling an electric motor supplied with current from a constant-potential generator and a variable-potential generator, which consists in starting the motor with current from one of said generators, gradually increasing the electromotive force of that current until its maximum potential is reached, maintaining the operation of the motor while cutting out the electromotive force of the variable-potential generator, adding together in series the electromotive forces from both generators, then gradually increasing the electromotive force of the variable-potential generator, substantially as set forth.

10. The combination with a source of electrical energy, of a motor-generator connected thereto, and a variable-speed motor, circuits for these machines, means for coupling up (in series in the induced circuit) the armature and field-coil of the variable-speed motor and the generator part of the motor-generator, means for varying the voltage of the current operating said variable-speed motor, and means for reversing said variable-speed motor, substantially as and for the purpose described.

11. In a system of electrical distribution having a constant-potential generator, a variable-potential motor-generator, and a variable-speed motor, the method of operating the said motor, which consists in taking from the constant-potential generator a small current and converting the same (by means of said motor-generator) into a large current and delivering the converted current to said variable-speed motor at starting, gradually increasing the electromotive force of the motor-operating current until a certain potential is reached, maintaining the operation of the variable-speed motor while the converted current is being withdrawn and the electromotive forces from the constant-potential generator and the motor-generator are being added together in series, and then gradually increasing the electromotive force from the motor-generator to augment the potential of the combined electromotive forces delivered to the variable-speed motor, substantially as described.

12. The method of operating a working motor supplied with energy from a constant-potential generator and a variable-potential generator, which consists in first applying energy to the variable-potential-generator armature, thereby rotating the same, then closing the circuit containing the said variable-potential-generator armature and the working motor, and then varying the field of said variable-potential generator thereby varying its voltage, and operating said working motor up to one-half its full duty, maintaining the action of the motor while the variable-potential-generator field is being cut out and then changing the various circuit connections to cut said field into the circuit again and place the generators in series with the motor, substantially as set forth.

13. The combination with an electric motor, of a supply-circuit, means for connecting the motor with the supply-circuit, a converter in circuit with the motor and with the supply-circuit, means for varying the electromotive force of the current from the converter and means for breaking the converter-circuit at an intermediate speed of the motor, substantially as described.

14. The combination with an electric motor, of a supply-circuit, means for connecting the motor with the supply-circuit, a converter in circuit with the motor and with the supply-circuit, and means for combining in multiple the currents from the supply-circuit and converter-circuit and means for reversing said motor, substantially as described.

15. The combination with an electric motor, of a supply-circuit, means for connecting the motor with the supply-circuit, a converter in circuit with the motor, a source of current-supply connected with the converter, means for varying the electromotive force of the current from the converter and means for breaking the converter-circuit, substantially as described.

16. The combination with an electric motor, of a supply-circuit, a local circuit induced from said supply-circuit, means for combining the current from the induced circuit with that from the supply-circuit, means for supplying said combined currents to the armature of the motor and means for reversing the motor, substantially as described.

17. The combination with an electric motor, of a supply-circuit, means for connecting the motor with the supply-circuit, a converter in circuit with the motor, a source of current-supply connected with the converter, means for combining the current from the converter-circuit with that from the supply-circuit, means for supplying said combined currents to the armature of the motor and means for reversing the motor, substantially as described.

18. The combination with an electric motor, of a supply-circuit, a local circuit induced from said supply-circuit, means for combining the current from the induced circuit with that from the supply-circuit, means for varying the electromotive force of the induced current, means for supplying said combined currents to the armature of the motor and means for reversing the motor, substantially as described.

19. The combination with an electric motor, of a supply-circuit, a local circuit induced from said supply-circuit, both of said circuits being connected with the armature of the motor, a rheostat in the supply-circuit, means for varying the electromotive force of the induced current and a switch adapted to open and close said induced circuit, substantially as described.

Signed at New York, in the county of New York and State of New York, this 27th day of October, A. D. 1896.

GRANVILLE T. WOODS.

Witnesses:
WM. H. CAPEL,
D. H. DECKER.